Patented Apr. 19, 1927.

1,625,494

UNITED STATES PATENT OFFICE.

HOLGER DE FINE OLIVARIUS, OF SAN FRANCISCO, CALIFORNIA, ASSIGNOR TO CALIFORNIA PACKING CORPORATION, OF SAN FRANCISCO, CALIFORNIA, A CORPORATION OF NEW YORK.

PROCESS OF PICKLING RIPE OLIVES.

No Drawing.  Application filed January 27, 1926. Serial No. 84,158.

This invention relates to a process of pickling ripe olives.

In the pickling of olives for the production of what is known in the trade as the ripe olive, it has been the practice heretofore, after suitably cleaning and size-grading the olives, to treat or cut the olives with lye. In some instances it has been the practice to perform the cutting as a series of successive lye treatments and between each treatment to expose the olives to contact with the air to darken the olives to the desired color. In other and more infrequent instances the cutting of the olives has been accomplished by a single protracted lye treatment followed by exposure to the air for the same general purpose. Other modifications of the lye treatment includes the pumping of air through the lye; withdrawing the lye from the olives and covering with water and pumping the air through the water; maintaining the olives covered with either lye, water or brine, and relying upon the amount of air dissolved therein without pumping air through the solution.

In practice the olives received for pickling vary considerably in ripeness as exhibited by their appearance. Upon the olives being subjected to the lye treatment above described, it has been found that the riper olives are first attacked by the lye reagent and exceed their maximum color and fall back in color before the greener olives can be brought to the required color. The riper olives contain the higher percentage of oil and are of better flavor but as the trade grades the product in accordance with its color appearance, the ripe or best olives will be thrown back in grade in the lye treatment due to the necessity of carrying the treatment forward to a point at which the greener olives will be brought to the proper color. It is also experienced and known that the individual olives subjected to the lye treatment above described will not be brought to a uniform color over their entire surfaces at the end of the pickling process, and that their color at the stem end will have passed its zenith and reverted to a brownish cast while the color at the opposite or blossom end will be the desired black cast. Because of the foregoing it has been the practice in the production of ripe olives and subsequent to the pickling process to color sort or grade the product, and this has resulted in lowering the grade of many of the olives that were, prior to the process, the ripest and darkest and otherwise the most desirable. This hand color sorting, required by the color irregularity in the same olive and the variations in color between the treated olives, increases the processing cost very materially.

I have determined that the difficulties above refered to are due principally to the fact that the riper the olive the more readily susceptible it is to the action of the lye treatment, and that the olive is more readily susceptible to the lye treatment at the stem end than at the blossom end. It appears that the oils, fats and allied constitutents in the skin and flesh of the olive opposes the action of the lye treatment by retarding the penetration of the lye reagent through the skin and into the olive, and that the structure of the olive at the stem end permits the penetration of the lye reagent more readily than at the blossom end. These factors have required employing with the prior methods a lye solution of sufficient strength to serve as a corrosive agent and this has usually been approximately 2 per cent in strength. The structure of the riper olives at the stem end is such that the corrosive action of the lye reagent tends to cut the skin and flesh of the riper olive more readily than a firmer greener olive.

I have discovered that if a suitable agent be employed to render the olives readily susceptible to the lye treatment that the tendency of the riper olives to reach the desired color prior to the greener olives and the tendency of the individual olives to first reach the desired color at the stem end and to there revert back in color can be substantially eliminated. This can be accomplished, I have found, by employing a solvent having the property of dissolving fatty and waxy materials from the skins of the olives. This renders the olives readily susceptible to the action of the cutting reagent and enables a relatively weak reagent to be employed and the time of treatment reduced. Under such conditions and by employing the relatively weak cutting agent, it is found that all of the olives may be brought to substantially the same color and that each olive will be of substantially the same color throughout its surface. On account of the uniform penetration of the weaker reagent and shorter exposure, less damage is done to the structure or skeleton of the olive itself, leaving it in firmer and better condition. Furthermore, the fact that the olives have been rendered more readily susceptible to the cutting action has been found to very substantially reduce the time required for the operation.

This invention, therefore, provides a method for producing a product having a better quality and a greater uniformity of color at a substantial saving in time, as compared with prior methods. By this process a uniformity of color is attained that substantially eliminates the necessity for color sorting.

This invention is adapted for wide application in use and may be incorporated in the varying different methods heretofore employed by the various ripe olive picklers. An example of an application of this invention to one method of pickling is as follows: After suitably size grading and cleaning, the olives are immersed for approximately seven minutes in a cutting solution comprising a properly denatured alcohol (95% ethyl alcohol, 5% sulphuric ether) in which is dissolved 1% lye (NaOH or KOH). In forming said solution, solid caustic soda or potash is generally employed and the term "lye" is herein deemed to include sodium or potassium hydroxide in solid form as well as water solutions of the same. The olives are then removed from the cutting solution and exposed to the action of the air for several hours (depending on the particular fruit and required color reaction). The olives are then immersed in a weak solution of lye (about ½%) for approximately one hour and then removed and again exposed to the air. This alternate lye treatment and exposure to air is repeated successively until the lye penetrates to the pit of the fruit, depending upon the characteristics of the fruit being treated. The olives are then washed with water to remove the lye and reaction products and thereupon brined in accordance with customary practices. The said illustrative method does not differ from prior methods subsequent to the treatment of the olives with the solvent except that a relatively weaker strength of lye can be employed throughout over substantially reduced periods of exposure and the successive operations may follow each other with greater rapidity.

It should be understood that the application of this invention is not limited to the foregoing example but is equally applicable to other methods of pickling ripe olives. For example, the invention may be employed where a single cutting operation is performed, in which case the solvent may be combined with the single cutting reagent employed. I have also found that the treatment of the olives by the solvent to render the olives susceptible to the action of the lye need not necessarily be performed simultaneously with the lye treatment but may precede the same as a separate operation, and that a series of successive combined solvent and lye treatments may be applied to the olives, if desired.

It has also been observed that the present invention substantially eliminates the salt shriveling that was experienced with the prior practice where the initial brine was somewhat too strong or even where proper care was taken with the first brining.

The invention is not limited to the particulars of the above illustrations but is of the full scope set forth in the following claims.

I claim:

1. A process of pickling ripe olives by cutting with lye, which includes the use of a solvent to render the olives readily susceptible to action of the lye.

2. A process of pickling ripe olives which includes treating the olives with a cutting agent in conjunction with a solvent adapted to render the olives readily susceptible to the action of the cutting agent.

3. A process of pickling ripe olives which includes immersing the olives in a solution of lye and an agent adapted to dissolve oils, fats and waxes from the olives.

4. A process of pickling ripe olives in which the olives are cut by lye, which includes treating the olives with alcohol to render the olives readily susceptible to the action of the lye.

5. A process of pickling ripe olives in which the olives are cut by lye, which includes treating the olives with an alcohol ether mixture to render the olives readily susceptible to the action of the lye.

6. A process of pickling ripe olives which includes treating the olives with a relatively weak lye solution in the presence of an agent to render the olives readily susceptible to the action of the lye.

7. A process of pickling ripe olives which includes treating the olives with a lye solution of substantially less than two per cent strength and alcohol to render the olives readily susceptible to the action of the relatively weak lye.

Signed at San Francisco this 14th day of January 1926.

HOLGER DE FINE OLIVARIUS.